Figure 1:
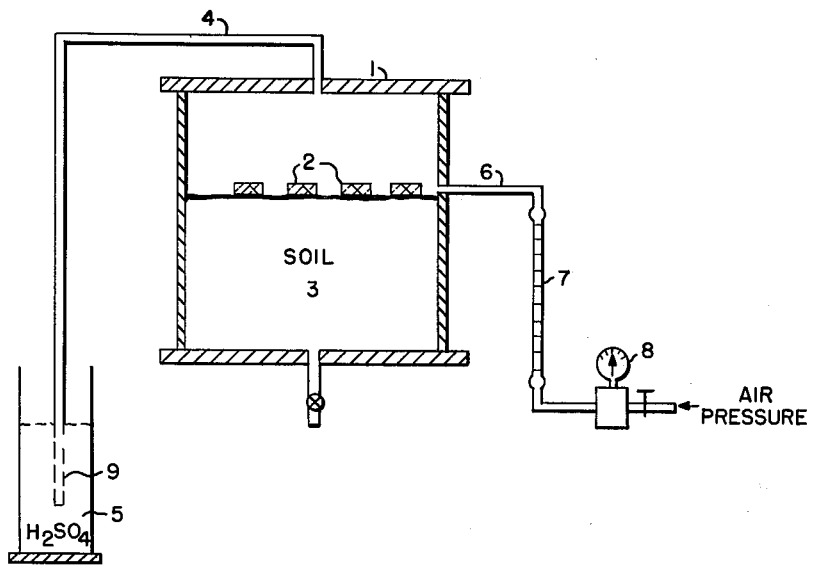

Feb. 1, 1966     K. SOR ETAL     3,232,740
AGRICULTURAL NUTRIENT CONTAINING UREA
Filed Oct. 24, 1962     3 Sheets-Sheet 1

APPARATUS USED FOR STUDYING VOLATILIZATION
LOSSES OF UREA FROM SOILS

Kamil Sor
Robert L. Stansbury     Inventors
Jack D. DeMent

By W. O. Heilman     Patent Attorney

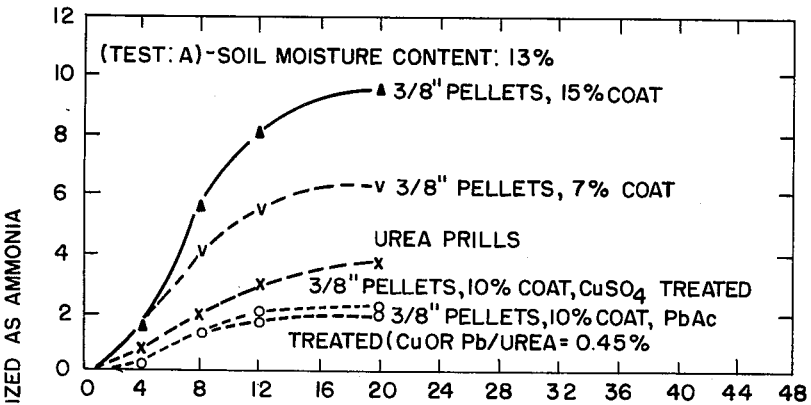
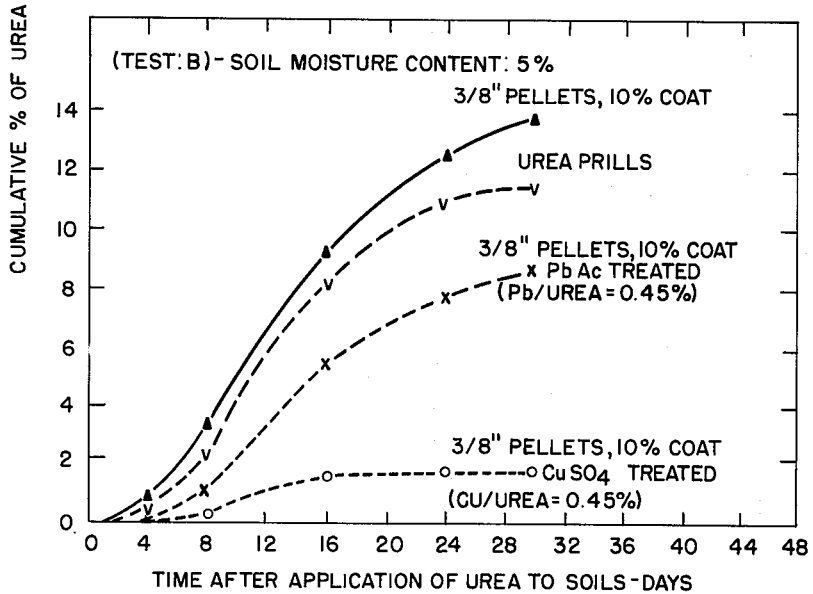

United States Patent Office 3,232,740
Patented Feb. 1, 1966

3,232,740
AGRICULTURAL NUTRIENT CONTAINING UREA
Kamil Sor, Linden, N.J., Robert L. Stansbury, Watertown, Mass., and Jack D. De Ment, Springfield, N.J., assignors to Esso Research and Engineering Company, a corporation of Delaware
Filed Oct. 24, 1962, Ser. No. 232,714
3 Claims. (Cl. 71—28)

The present invention is concerned with improved controlled-availability agricultural and animal feed compositions. The invention more particularly relates to fertilizer and feed compositions having improved properties with respect to the rate of release of nutrients for plant and animal growth. More particularly the invention is concerned with urea containing fertilizer and feed compositions in which the particles of mineral nutrients are impregnated or coated with solid hydrocarbons of the nature of paraffin waxes, asphalts and petroleum resins. A preferred composition comprises a fertilizer composition in which is incorporated a solid petroleum hydrocarbon.

The specific composition of the present invention comprises a pellet having incorporated therein a solid hydrocarbon such as wax and/or asphalt, urea and an inhibitor selected from the class consisting of methyl-urea, thiourea, sym-dimethyl urea, unsym-dimethyl urea, phenyl urea, t-butyl urea, and n-butyl urea. The preferred alykylated urea contains an alkyl group containing from about 1 to about 10 carbon atoms in the alkyl group as, for example, monomethyl urea.

It is well known in the art to use various agricultural aids such as fertilizers, herbicides, fungicides, insecticides and fruit dust containing active control ingredients. These active control ingredients are normally used with various carriers such as with inert solid materials, aqueous solutions and other solvents and the like. For example, fertilizers for promoting plant growth are of two basic types. The oldest type comprises natural organic materials which have certain disadvantages; e.g. their decreasing supply and low nutrient level are inadequate to maintain sufficient food for our ever increasing population. The second type of fertilizer is known as commercial mineral fertilizer mixture and consists largely of organic and inorganic compounds of nitrogen, phosphorus and potassium. Commercial fertilizers have a number of disadvantages. The readily soluble nitrogen compounds may cause injury to crops and may be readily leached into the lower soil layers where the roots of the plants cannot absorb them. The inorganic phosphorus and potassium nutrients of the fertilizers tend to become fixed by the clay colloids in the soil and are thus not available to the plants in adequate quantities. Additionally with some legume and grass crops the initially high uptake of potassium as well as nitrogen from readily soluble fertilizers may create a toxic condition with resultant injury to the plants.

It is also known in the art to use as an agricultural nutrient urea and urea compounds. However, one disadvantage of urea is that an excessive nitrogen loss as ammonia occurs. This is due to the fact that when urea is placed under or on the surface of soils as a fertilizer, it is hydrolyzed by the influence of urease enzyme which is abundant wherever general microbiological activity exists. The reaction is as follows:

$$CO(NH_2)_2 + 2N_2O \xrightarrow{urease} (NH_4)_2CO_3$$
$$(NH_4)_2CO_3 \longrightarrow NH_4HCO_3 + NH_3\uparrow$$

Some portion of the ammonia thus formed is held by the base absorbing constituents of soils and the rest (up to 50%) is lost by escaping into air.

In order to overcome this loss of urea as ammonia in soils, many suggestions have been made. For example, Gaylord M. Volk of the Florida Agricultural Experiment Station in "Agricultural and Food Chemistry," vol. 9, No. 4, pages 280–283, 1961, in his report directed toward the inhibition of the urease enzyme states as follows:

"Table I is an attempt to apply this principle to the current problem by dusting urea pellets with copper sulfate prior to application to the soil. According to the data obtained, significant inhibition of urea hydrolysis appears to be impractical by this method, but further study is needed. Apparently, urea diffusers out of the zone of copper effect, thereby rendering the latter ineffective. Copper is readily immobilized by soil, while urea moves freely with soil moisture or by diffusion."

TABLE I

Effect of copper sulfate dust or gypsum on volatile loss of ammonia from pelleted urea-nitrogen, surface-applied at 100 lbs./acre rate in laboratory tests on moist Lakeland fine said, pH 5.6

| Treatments, Urea 1 to 2 Millimeters Diameter | Replication No. | Nitrogen Loss as $NH_3$ in 7 Days, Percent |
|---|---|---|
| Urea | 1 | 34.4 |
|  | 2 | 36.4 |
|  | 3 | 37.9 |
|  | Ave. | 36.2 |
| Urea+0.25% Cu by weight of urea [1] | 1 | 32.0 |
|  | 2 | 32.2 |
|  | 3 | 34.1 |
|  | Ave. | 32.8 |
| Urea+$CaSO_4.2H_2O$ at 1–1 ratio | 1 | 33.6 |
|  | 2 | 31.5 |
|  | 3 | 38.6 |
|  | Ave. | 34.6 |

[1] Applied as dry coating to urea pellets, 0.4% Cu was similarly ineffective.

In accordance with the present invention, it has been found that the loss of ammonia by volatilization can be substantially reduced by the partial inactivation of the urease enzyme by using an effective amount of an inhibitor which is incorporated at amounts from about .01 to 3% by weight, in the urea crystals or coated and uncoated pellets.

These inhibitors are selected from the class consisting of urea derivatives such as methyl-urea, thiourea, sym-dimethyl urea, unsym-dimethyl urea, phenyl urea, t-butyl urea, and n-butyl urea.

These inhibitors are added by any satisfactory method. A preferred method of adding these inhibitors is as follows: Urea crystals, preferably between 20 and 80 mesh, are treated with small amounts of inhibitors which are also ground and sieved. The size of inhibitor particles should be smaller than 60 mesh, preferably less than 120 mesh. During the addition of inhibitor, fertilizer is mixed so that a uniform mixture of inhibitor and urea is obtained.

Thus, it is the object of the present invention to provide agricultural compositions comprising urea such as fertilizer compositions and a method of production thereof in which the active material such as nutrient constituents are released over an extended and predetermined period of time. For example, fertilizer compositions unite the benefit of mineral and organic fertilizers. Crop injury is minimized and the efficiency with which the nutrients are supplied to the plants, as shown by greater rate of growth is increased. Thus, in accordance with one adaptation of the present invention, commercial fertilizers comprising urea are coated or imgregnated with solid hydrocarbons. The fertilizer may be coated or impregnated as finished formulation prior to final packaging, or each one of the fertilizer components may be coated or impregnated before blending. The treating is accomplished either by dipping the fertilizer into the molten hydrocarbon, by spraying the hydrocarbon onto the surface of the fertilizer, by ejecting liquid fertilizer and hydrocarbon into a common stream to form "prills" or by adding the molten hydrocarbon to the fertilizer while it is being mixed. The term "incorporating" is intended to cover all of these methods of treating the fertilizer with the petroleum hydrocarbon.

Preferably the hydrocarbons comprise petroleum waxes, most desirably those of the microcrystalline type, although petroleum asphalts and petroleum-derived resins (e.g. steam cracked resins) may also be employed. Also contemplated are blends of waxes with asphalts and/or petroleum resins as well as blends of asphalts with the resins. For example, a blend of a microcrystalline wax or a paraffin wax with from 50 to 95% by weight of a petroleum asphalt might be used as compared to about 5 to 50% of the wax. The amount of wax, asphalt or resins or blends thereof used as compared to the urea may be within the range of from about 0.1% to about 25% by weight of the total composition, although the preferred range of hydrocarbon used is from about 3% to 15% based on the weight of the fertilizer used.

In accordance with a preferred adaptation of the present invention, the composition comprises homogeneous pellets of the active ingredient urea and the solid hydrocarbon as, for example, the wax. This is to be distinguished from pellets of active ingredient coated with a solid hydrocarbon. When using a pellet of this latter character, once the coating is broken, the active ingredient will leach rapidly away. Thus, in the earlier stages, substantially no active agricultural ingredient is imparted to the growing plant and when the coating is broken, the rate rapidly increases. By utilizing a pellet homogeneously mixed therethrough with the active urea fertilizer and the wax, a uniform release of the active agricultural ingredient is secured.

According to the present invention, a fertilizer composition is preferably formed into pellets of leach resistant type by a suitable method. One example is an extrusion process using suitable equipment, so that the fertilizer product as prepared for the market comprises small pellet particles ranging from a size of about 1/16-inch in diameter, and one or two or more 16ths of an inch in length, to a size of 1/2-inch diameter and a length a little greater or of the same general order. For special applications, pellets may be even larger. Another method that is useful utilizes a rotating plate or disc mounted on an inclined axis. Powdered material is placed centrally on the plate and the pellets are rolled up as the powder moves towards the plate's periphery while powder contacts a liquid binder material.

A particularly preferred form of the invention involves first the coating of individual particles or small agglomerates with subsequent formation of larger agglomerates or pellets incorporating the smaller. Supplemental binding or water resistant materials may be incorporated also as the repelleting proceeds.

A suitable pelletized fertilizer also may be made by first preparing the individual fertilizer components themselves in granulated form of appropriate particle size, as is commonly done in the fertilizer industry. These particles should be smaller than about 6-mesh in U.S. sieves, a size below 10-mesh being more desirable, and a grain size passing a 20-mesh sieve being particularly preferred. It is usually desirable also to separate the very fine materials from the granules. The granules, properly screened, are then blended either as individual fertilizer components or as a mixture with small amounts (from about 2 to 25% by weight) of a binder. A typical binder composition is a molten or liquid hydrocarbon material which is normally solid and which has a softening or melting point above at least 120° F. and preferably above about 130° F. Preferably, where a heated binder is used, the granular fertilizer ingredients are also heated to a temperature at least as high as the melting point of the binder (e.g., hydrocarbon) material, after which the latter, desirably at a somewhat still higher temperature than its melting point, is mixed and blended into the fertilizer until the composition is substantially uniform. Instead of heating, binder may be blended with evaporable solvent to facilitate mixing and particle coating. Binders also may be made wholly or in part of thermoplastic resins or plastics such as polyvinyl compounds, polyethylene, polypropylene, petroleum based resins or the like. These also may be either melted or may be dissolved in suitable evaporable solvents prior to mixing.

A mixture of the types described above, while still plastic, in one preferred method is next extruded through suitable dies to form pellets or small rod-like particles which are compact and solid in structure. The material should contain enough liquid binder to lubricate the dies to some extent, but should be of fairly firm and solid consistency when pelletized. Extruding means are known and form no part of the present invention. Any suitable type may be used, e.g. one wherein the plastic mixture can be forced through orifices or tubular openings of appropriate size and shape. Pellets of 1/16-inch to 1/2-inch or so in diameter are most commonly preferred. The die openings are proportioned in length or taper or otherwise so designed that the frictional forces resisting extrusion will cause the desired degree of compaction to make a strong, firm pellet. The extruded portions as they emerge from the die are cut off or broken off into short rod-like particles, preferably between about 1/16-inch and 3/4-inch in length. Thereafter, the particles or pellets, if made with molten binder, are cooled promptly to a temperature below the softening or melting point of the hydrocarbon. When solvent is used, some heat may desirably be applied to expedite pellet drying and hardening. The resulting product is a dense compact particle, of a size that can easily and quite accurately be controlled. It has the desired properties, including a relatively smooth hard surface, and resists rapid water leaching assuming that the binder composition is properly selected. For example, a commercial fertilizer composed of a mixture of urea is mixed with a hot liquid hydrocarbon composition containing about 90% by weight of asphalt and 10% microcrystalline wax. A particularly preferred binder has a softening point above about 150° F. When these ingredients are mixed in proportions of about 87% by weight of urea and 13.0% hydrocarbon and pelletized to a size of about 3/8" diameter and of similar or somewhat greater length, the product is found to be very resistant to water leaching.

The water leaching rate and the consequent life of the fertilizer materials may further be controlled as desired, according to the invention. This can be done by first forming small pellets, for example, 1/16-inch diameter and 2 or 3/16-inch in length, and then mixing these pellets with further amounts of binder. The binder added may be with or without addition of unpelleted fertilizer, but it is usually preferred to add granular or powdered fertilizer or other solid material to the binder. This mixture, thereafter formed into pellets larger than the first, proves to be highly selective in its release rate to growing plants. In fact, the release rate can be controlled with considerable accuracy by establishing the proper proportions of ingredients and the most suitable relative size of internal granules or sub-pellets and the finished pellets.

Thus, one adaptation of the present invention is carried out by combining the urea and the hydrocarbon and forming the composition into firm and water resistant pellets or agglomerates. These are preferably formed by first mixing granules of appropriate size and composition, such as are found in standard commercial ureas, with sufficient proportions of binder material, preferably also water repellent, as to coat the individual granules at least to some extent. Additional materials are then incorporated with the coated or partially coated granules, after which materials are compressed or otherwise compacted into pellets or agglomerates of larger size than the original granules. Various binder materials may be used such as heavy hydrocarbon residues, asphalts, waxes, blends of these materials, and/or synthetic plastic materials such as various polymers. These may be heated to liquefy them while mixing is accomplished, or they may be dissolved in low boiling solvents which will evaporate to leave the binder in place on the granules. Prior to pelleting or agglomerating, however, additional material is added to further reduce the rate of leaching when excess quantities of water come into contact with the fertilizer. Suitable materials for this purpose may be water insoluble inorganic materials such as calcium carbonate, chalk, finely divided limestone rock, calcined lime, gypsum, fine clays, crushed phosphate rock which has not been acid treated to make its phosphorus ingredients available to plants and the like. In addition or in lieu of these inorganic materials, supplementary quantities of organic substances such as the heavy hydrocarbons and polymeric materials mentioned above may be blended.

As pointed out heretofore, the particle size may vary appreciably. The pellets may be in the form of beads or of any other geometric configuration such as a pill, cylinder and the like. The size of the pellets may vary appreciacby, but are preferably below about 2 inches in any one dimension as, for example, 2 inches in diameter. It is preferred that the particle size of the pellets vary in the range from .05 to .5 inch so as to secure better distribution in application. These pellets, as pointed out heretofore, may be secured by any means known in the art as, for example, by spray gun production wherein the molten stream is sprayed into the air or other medium, causing solidification of the petroleum hydrocarbon containing uniformly distributed therethrough the active ingredient.

Thus, the present invention is specifically concerned with an improved fertilizer pellet comprising urea which has been stabilized against urease enzyme action by the use of a compound selected from the class consisting of urea derivatives such as methyl-urea, thiourea, sym-dimethyl urea, unsym-dimethyl urea, phenyl urea, t-butyl urea, and n-butyl urea.

The amount of inhibitor used may vary appreciably but generally is in the range from about 0.01 to 10.0% by weight based on the amount of urea present, and is preferably in the range from about 0.10 to 3.0% by weight.

The amount of urea present in the pellet may also vary appreciably as compared to the solid hydrocarbon. However, it is preferred that the amount of hydrocarbon present by weight based upon the total amount of urea is in the range from about 3 to 25% by weight, preferably from about 8 to 15% by weight.

While any solid hydrocarbon may be utilized as, for example, a wax or an asphalt, it is preferred that the hydrocarbon comprise from 5 to 50% wax as compared to 50 to 95% asphalt. The wax preferably has a melting point in the range from 100 to 170° F., preferably in the range from 140 to 160° F.

The asphalt has a penetration in the range from about 15 to 200, preferably in the range from 31 to 50. In general, the asphalt should have a softening point above about 120°, preferably in the range 130 to 160° F.

Figure 3:
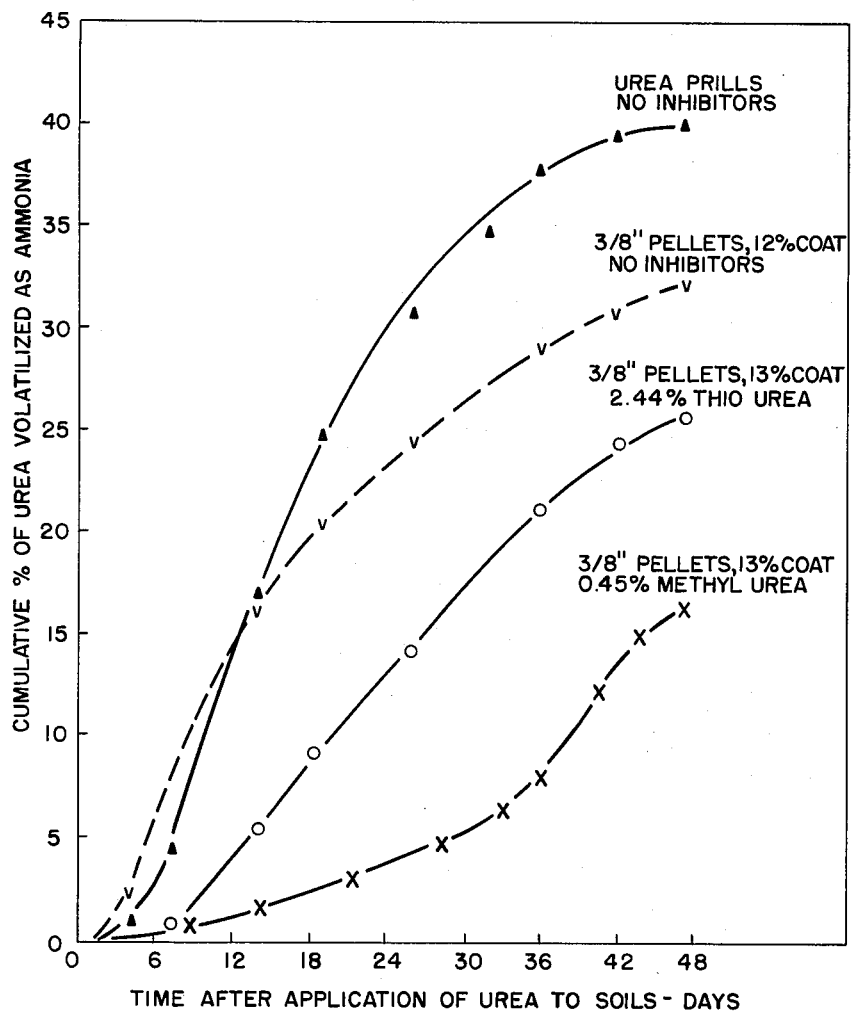

The present invention may be readily understood by reference to the figures illustrating the same. FIGURE 1 illustrates the apparatus used for determining the urea loss. FIGURE 2A plots the data secured in various runs when utilizing a soil moisture content of about 5%, while FIGURE 2B illustrates data secured in various runs when using a soil moisture content of about 13%. The soil used in FIGURES 2A and 2B had a pH of 5.5. FIGURE 3 indicates the results obtained by the use of a soil with a soil moisture content of 6.4% and a pH of 7.5.

Referring specifically to FIGURE 1, soil with a given moisture content is packed into the Lucite cylinder 1. Then matrix urea 2 is placed on the surface of the soil 3 at an amount equivalent to the rates of urea generally applied under field conditions. The unit then is closed airtight. Air pressure of about 0.5 p.s.i. is introduced by line 6, passed over the soil and ammonia is carried through the tubing 4 into standardized sulfuric acid 5. Rate of air flow was about 20 ml. per minute. Three times a week the acid was titrated with a normalized sodium hydroxide solution and the amount of ammonia neutralized by the acid calculated.

The urea pellets were prepared as follows:
Urea crystals <12 mesh are heated up to 110–140° F. Inhibitors, <100 mesh in size, are added to the warm urea and mixed thoroughly. The amount of thiourea used was 2.44%, while the amount of methyl urea used was 0.45% in urea.

A hydrocarbon blend (90% 31–40 pen asphalt and 10% microcrystalline wax) is first softened by heating it up to 220° F. and then the blend is added to warm urea. The amount of hydrocarbon blend in urea, in these cases, were between 7 to 15% by weight. This mixture is thoroughly blended for about 10 minutes and then is pelletized by extruding it from a pellet mill. Pellets thus formed can be in sizes between $\frac{1}{16}''$ and $\frac{3}{8}''$ in diameter.

The results for the 13% moisture test in FIGURE 2A show that at the end of 20 days, volatilization losses from conventional urea prills were 3.7%, while losses from uninhibited matrix urea pellets of 7% hydrocarbon and 15% hydrocarbon binder were 6% and 9.4%, respectively. There are two main reasons why losses were larger from matrix urea pellets than urea prills. (a) A large part of the urea in the matrix pellet was not in direct contact with the soil, so that a larger proportion of the $NH_3$ volatilized escaped directly into the atmosphere without being adsorbed by the soil, and (b) matrix pellets decrease the nutrient release rates of urea, therefore keeping urea in an undissolved form and hence at the surface longer in pellets than prills. The volatilization losses of urea from copper and lead treated matrix pellets (0.45 part metal ion per 100 parts of urea) were 2.1 and 1.8%, respectively. Thus, the decrease of volatilization loss by enzyme deactivating metal ions was as much as three-fourths.

The results of the volatilization test conducted in the soil with 5% moisture content are presented in FIGURE 2B. In this test volatilization losses continued for one month, while in the first test losses had stopped within 20 days. In the second test losses were larger than in the first. These differences are readily understood when it is remembered that in dry soils the fraction of pores occupied by water is smaller than in wet soils. Therefore, $NH_3$ sorption by water and colloids of soils is less in dry soils than in wet ones. In this second test $NH_3$ loss was 11.2% for urea prills and 13.7% for uninhibited matrix urea. The $NH_3$ loss from inhibitor treated matrix urea pellets (made with 10% hydrocarbon binder) was 8.6% for lead acetate and 1.7% for copper sulfate. As before, the metal ion concentration was 0.45 part per 100 parts of urea.

Next the volatilization test was carried out in the same sandy soil with the pH adjusted to 7.5 (by the addition of lime). The moisture content was 6.4%, close to the wilting point. These results (FIGURE 3) indicate that during the first 12 days of incubation urea prills lost up to 2% less $NH_3$ than uninhibited matrix urea pellets. After 12 days the loss from prills increased faster than from pellets and at the end of 47 days prills had 7.5% more loss than pellets. At the end of 47 days loss of nitrogen from prills was 39.5%, while the loss from matrix urea pellets was 32%. The higher loss from pellets than prills in the first 12 days of the experiment is probably due to the reasons explained before. The reason for the larger loss from prills than pellets after 12 days of incubation is probably due to favorable conditions provided by the complete dissolution and movement of urea prills into the soil. The presence of a high urea concentration in soil increases the activity of micro organisms which in turn multiply the activity of urease enzyme. The deactivating effect of thiourea and methyl urea were significant in that both of these urea derivatives decreased the volatilization losses of urea considerably. At the end of three weeks of incubation losses from urea prills, thiourea treated pellets and methyl urea treated pellets were about 26%, 11% and 3% respectively. At the end of 47 days of incubation, volatilization losses for these three types of urea were about 39.5%, 25.5% and 16% respectively. These results indicate that urea derivatives, i.e. thiourea and methyl urea decrease the volatilization losses of urea several fold.

What is claimed is:

1. An agricultural nutrient composition pellet which consists essentially of urea particles from 6-mesh to 80-mesh size as the nutrient mixed thoroughly with 60-mesh to 120-mesh size particles of urease inhibitor selected from the group consisting of methyl-urea, thiourea, sym-dimethyl urea, unsym-dimethyl urea, phenyl urea, t-butyl urea, and n-butyl urea in a proportion of 0.01 to 10.0 wt. percent of the urea to inhibit decomposition of the urea in the pellet of urease, said nutrient and said urease inhibitor being bound and coated with 3 to 25% by weight based on the amount of urea of a solid petroleum hydrocarbon selected from the group consisting of paraffin waxes, petroleum asphalts, petroleum resins, and blends thereof, said nutrient urease inhibitor and solid petroleum hydrocarbon forming a compact, firm, and strong pellet.

2. An agricultural nutrient composition pellet as defined in claim 1 in which the solid petroleum hydrocarbon is a blend of 5 to 50% by weight of paraffin wax and 5 to 95% by weight of a petroleum asphalt.

3. An agricultural nutrient composition pellet which consists essentially of urea particles smaller than 12-mesh size, intimately mixed with urease inhibitor consisting of methyl urea particles of smaller than 100-mesh size in an amount of 0.45% by weight of the urea, said urea and urease inhibitor being bound and coated with a solid petroleum hydrocarbon blend consisting of 90 wt. percent asphalt and 10 wt. percent microcrystalline wax based on the total amount of hydrocarbon blend, said blend being present in an amount of 3 to 25% by weight of urea in the pellet.

References Cited by the Examiner
UNITED STATES PATENTS

| | | | |
|---|---|---|---|
| 2,369,110 | 2/1945 | Harford | 71—64 |
| 2,743,208 | 4/1956 | Marcuse et al. | 252—384 |
| 2,936,226 | 5/1960 | Kaufman et al. | 71—64 |
| 2,943,928 | 7/1960 | Guth | 71—64 |
| 3,014,783 | 12/1961 | Young | 71—64 |
| 3,024,098 | 3/1962 | Austin et al. | 71—64 |
| 3,042,718 | 7/1962 | Evans et al. | 71—64 |

DONALL H. SYLVESTER, *Primary Examiner.*
ANTHONY SCIAMANNA, *Examiner.*